Sept. 15, 1964 J. METHVEN ETAL 3,148,849
ARRESTING WIRE SUPPORT
Filed Nov. 28, 1962 3 Sheets-Sheet 1

INVENTOR.
JAMES METHVEN
BY ELWOOD SCHOLLENBERGER

ATTORNEY

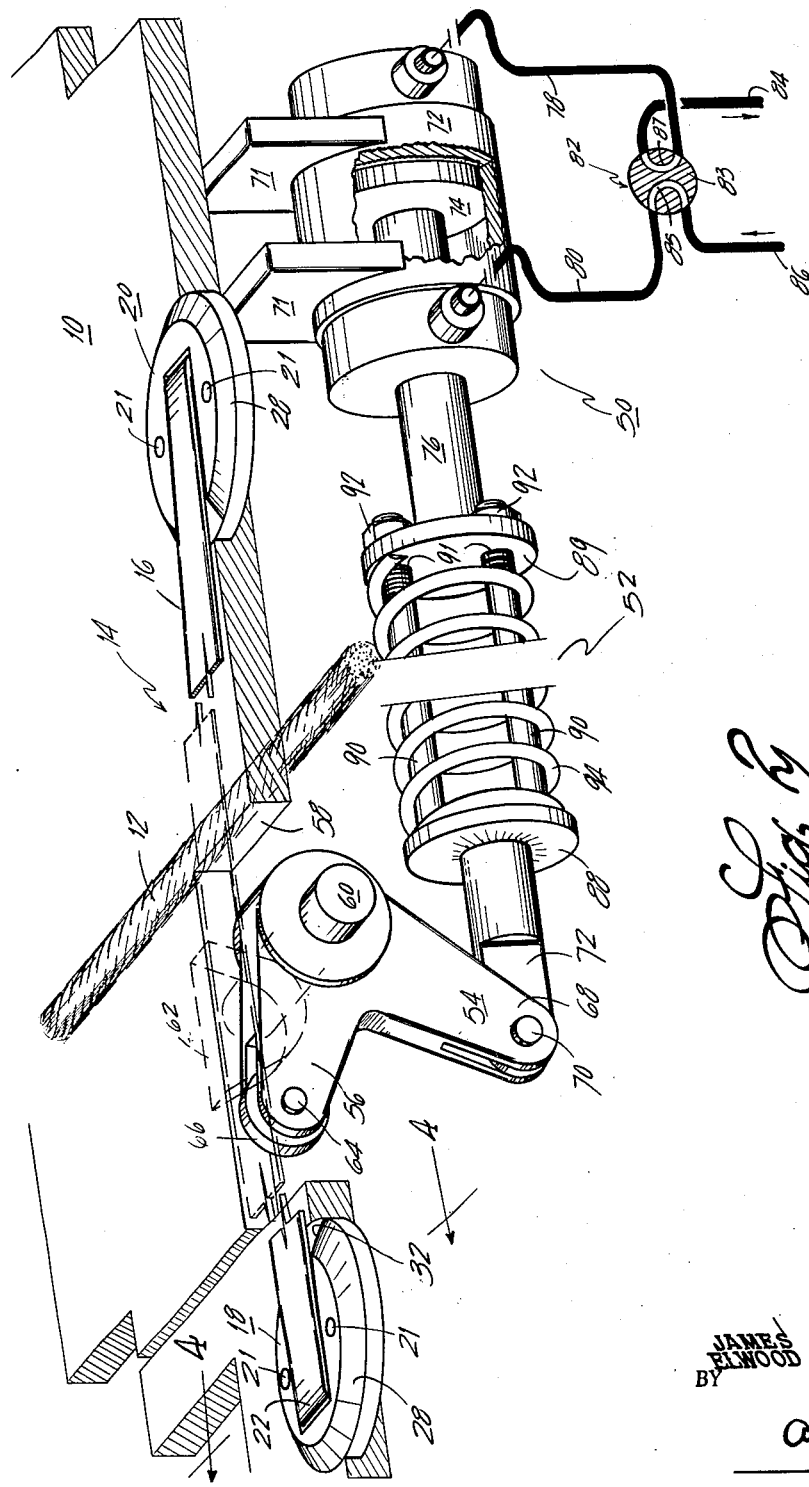

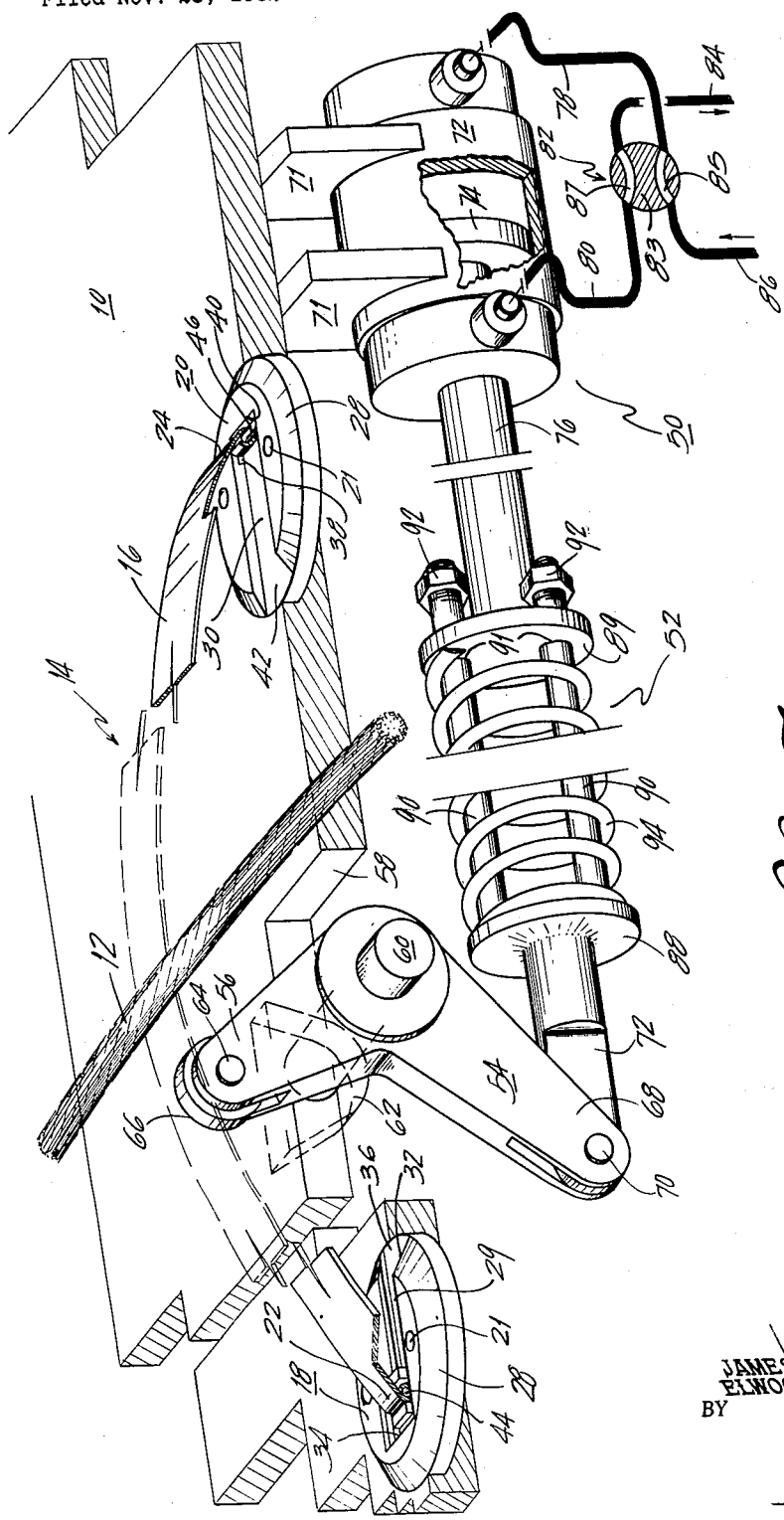

3,148,849
ARRESTING WIRE SUPPORT
James Methven, Morton, and Elwood Schollenberger, Springfield, Pa., assignors, by direct and mesne assignments, to the United States of America as represented by the Secretary of the Navy
Filed Nov. 28, 1962, Ser. No. 240,766
5 Claims. (Cl. 244—110)

The invention described herein may be manufactured and used by or for the Government of the United States of America for governmental purposes without the payment of any royalties thereon or therefor.

This invention relates to supports and particularly to the type used for holding an aircraft pendant at a predetermined elevation above the landing surface.

To halt an aircraft in a limited distance on a landing surface it is common to install a tensioned arresting cable, or deck pendant, across the landing path. The aircraft is halted by an arresting hook, suspended from it, engaging the pendant.

Engagement of the hook with the pendant is facilitated by support elements holding the pendant a few inches above the landing surface so that the hook can readily get under and engage it.

This invention provides a support that will raise a pendant to a desired elevation, which is yieldable to impact loads on it, which is subjected to a minimum amount of stress fatigue, and which is economical to construct and is readily installed.

The manner in which these provisions are achieved will be apparent from the following description when read in view with the accompanying drawings wherein:

FIG. 2 is a longitudinal sectional view along line 2—2 of FIG. 1 showing the support in a lowered position and with some parts broken away;

FIG. 3 is a view similar to FIG. 2 showing the support holding the pendant in a raised position.

Figure 1:
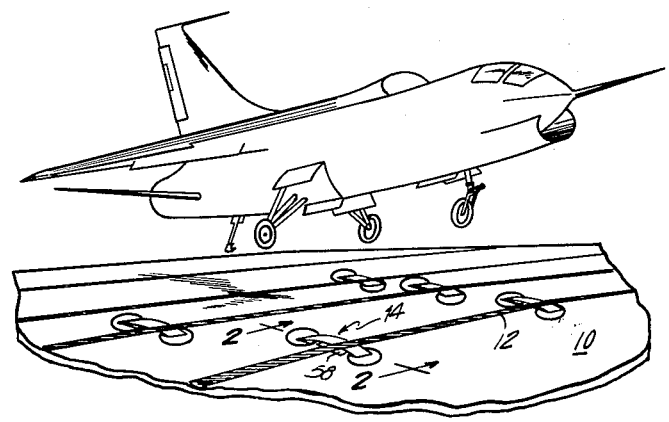
FIG. 1 is a perspective view showing a landing surface having a deck pendant employing support constructed in accordance with the invention.
Figure 4:
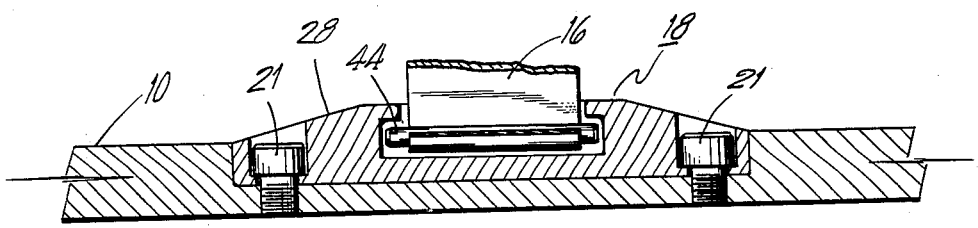
FIG. 4 is a sectional view taken along line 4—4 of FIG. 2.

Describing the invention generally, it has a leaf spring, placed under the pendant, which is adapted to be flexed between flat and arcuate shapes. When the spring is flat, it is unstressed, and while the spring is so shaped, the pendant lies on the landing surface. By stressing the spring until it assumes an arcuate shape, the pendant is elevated to the desired position for an arrestment.

In detail and referring to the drawing, 10 indicates a landing surface, such as an aircraft carrier's deck, having a pendant 12 extending across it and over a plurality of spaced supports 14. The pendant is normally tensioned and is secured to an energy absorbing device, not shown, for gradually and rapidly halting its translatory movement as would occur with engagement by an arresting hook suspended from a landing aircraft, not shown.

Each support 14, FIG. 2, includes a resilient member 16 held at its ends in stay brackets, 18 and 20, which are fastened to the deck by bolts 21. Resilient member 16 is a flat metallic bar or leaf spring with a portion at its ends, 22 and 24, turned under to form eye holes.

The stay brackets, 18 and 20, are metallic disks chamfered, 28, on their upper edges and having slots, 29 and 30, respectively, in their top surfaces; the slots are opened at one end. The side walls of slot 29 in bracket 18 have horizontal grooves, 32, extending from its closed end 34 to substantially its open end 36; whereas, slot 30 in the other bracket, 20, has opposed horizontal holes, 38, in its side walls located near its closed end, 40, and also an open end 42.

Brackets 18 and 20 are longitudinally spaced on the deck with a bracket on each side of pendant 12 and countersunk into the deck as shown in FIGURE 2. Resilient member 16 lies between the brackets under the pendant, with its ends in the brackets' slots 29 and 30, almost abutting the slots' closed ends, when the resilient member is flat or depressed as shown in FIGURE 2. The resilient member, when flat or depressed, rests on the bottoms of the bracket slots 29 and 30 and passes through their open ends 36 and 42.

Each end of resilient member 16 is secured to a bracket. End 22 of the resilient member is connected to bracket 18 by a pin 44 in the member's eye hole. The pin 44 has its ends extend beyond the sides of the resilient member into the grooves, 32, in the side wall of slot 29. Similarly, the other end, 24, of the resilient member is secured to bracket 20 by a pin 46 that has its ends seated in the side wall holes 38 of the bracket's slot 30. This construction allows the resilient member 16 to pivot at one end in bracket 20 and slidably pivot at its other end in bracket 18, thus enabling it to be pushed upwardly into the arcuate shape required for raising the pendant lying on it, as shown in FIGURE 3.

The power required to arch the resilient member 16 is supplied from an actuator 50 through a yieldable connector 52 by a lever 54. Lever 54 is L-shaped and has one of its legs 56 project through a cut-out 58 in deck 10. A shaft 60 passing through the junction of the lever legs is mounted in bearings 62 secured to the underside of the deck for supporting the lever. The end of lever leg 56 projecting through the deck cut-out has a bifurcation with an axle 64 carrying a roller 66 that rides on the under surface of resilient member 16 to reduce friction between them. The other leg 68 of the lever is also bifurcated and is connected by a pivot pin 70 to a tie rod 72.

Actuator 50 includes a cylinder 72 fastened by brackets 71 under deck 10 having a piston 74 with a piston rod 76 extending therefrom toward lever 54. Conduits 78 and 80 connect opposite sides of actuator cylinder 72 with a 4-way valve 82 which in turn is connected with a vent line 84 and a fluid pressure supply line 86 extending from an unshown source. Valve 82 is conventional and may, as shown, have a turnable member 83 with a pair of passages 85 and 87 so that, with turning it in one direction, it connects the supply line 86 to conduit 78 and the vent 84 to conduit 80, as in FIGURE 3; whereas, the connections are reversed with turning of valve member 83 in an opposite direction, as in FIGURE 2.

To avoid breaking resilient member 16 by excessive external force, as for instance, under the weight of an aircraft rolling over it while it is in a raised position, FIG. 3, the connector 52 joining lever 54 and actuator 50 is designed to yield. It includes an end plate 88 secured to the end of tie rod 72, by welds, threads, or other suitable means, and a plate 89 similarly fastened to the actuator piston rod 76. A number of bolts 90 are threaded into the face of end plate 88 that slidably protrude through holes 91 in the plate 89 fastened on the piston rod. The ends of bolts 90 carry stop nuts 92 to limit movement of the plates away from each other, and a compression spring 94 is carried by bolts 90 with its ends abutting the plates 88 and 89 which normally tends to hold them apart a distance determined by the threading of the nuts 90.

In the operation of the device, to raise resilient member 16 to the position of FIG. 3, 4-way valve 82 is turned to admit fluid pressure through line 78 to the back of actuator piston 74. This vents the opposite side of the piston through line 80 and allows the piston 74 to move toward the left, as viewed in FIGURE 3. The motion of the piston is transmitted through the connector spring 94 to lever 54 causing it to pivot and raise resilient member 16 with its rising leg 56. In this position, resilient member 16 is under tension, since its natural shape is flat. However, since the "up" time is small compared to "down" time, because aircraft arrestments generally are infrequent, the resilient member lies on the deck most of the time in its natural shape, flat, and consequently undergoes little stress overall.

Spring 94 is a stiff compression member which will transmit motion from the actuator piston 74 with little compression of itself. However, because excessive force on resilient member 16 causes the lever to pivot and move tie rod 72 toward actuator 50 and since the actuator piston is, in effect, fixed, while holding the pendant raised, the spring, 94, is compressed under this circumstance.

To lower the resilient member 16 the 4-way valve member 82 is turned to vent line 78 and furnish fluid pressure through line 80, as in FIGURE 2. This moves piston 74 to the right. Lever 54 is pivoted and its leg 56 lowered thereby and the resilience of resilient member 16 causes it to assume its flat shape and lie against the landing surface.

The shape of resilent member 16 in the raised position, which is arcuate, is desired for permitting sliding movement along it in direction of the moving aircraft to be arrested by the pendant.

Obviously, many modifications and variations of the present invention are possible in light of the above teachings. It is therefore to be understood that within the scope of the appended claims the invention may be practiced otherwise than as specifically described.

What is claimed is:

1. A support for raising an aircraft arresting pendant a predetermined height above a landing surface comprising an elongated non-extensible resilient member having a flat shape while unstressed to be disposed under said pendant,
    means for pivotally securing said member at one of its ends to said landing surface and pivotally and slidably secured at its other end to said landing surface,
    a lever adapted to be pivotally secured to said landing surface having an end positioned intermediate the ends of said resilient member for applying a lifting force thereto, and
    an actuator connected for supplying said lifting force to said lever and causing said resilient member to be stressed into an arcuate shape and raise said pendant thereby.

2. The support of claim 1 including a yieldable connector joining said lever to said actuator for transmitting said lifting force from said actuator to said resilent member and yielding to excessive external force applied on said member and permitting said member to lower during the application thereof.

3. A support for raising an aircraft arresting pendant a predetermined height above a landing surface comprising a leaf spring having a normally flat shape while unstressed and adapted to be disposed under said pendant and be arched upwardly at its center to raise said pendant,
    a bracket for pivotally securing one end of said spring to said landing surface,
    a second bracket for pivotally and slideably securing the other end of said spring to said landing surface,
    a lever adapted to be pivotally connected intermediate its end to said landing surface and having an end disposed for lifting said spring, and
    an actuator connected to the other end of said lever for applying a lifting force thereto whereby said spring is elevated into an arcuate shape.

4. A support for an aircraft arresting pendant extending across a landing surface comprising a leaf spring having a normally flat shape while unstressed and adapted to be disposed under said pendant and be arched upwardly at its center to raise said pendant,
    brackets for securing the ends of said spring to said landing surface,
    a lever adapted to be pivotally connected intermediate its ends to said landing surface and having an end disposed under said spring,
    an actuator having a piston extending therefrom, and
    a yieldable connector joining said piston rod with the other end of said lever.

5. The support of claim 4 wherein said connector comprises an end plate secured to said piston rod and an end plate secured to the other end of said lever,
    means securing said end plates for limited movement toward and away from each other,
    and a compression spring disposed between said end plates normally urging them apart.

References Cited in the file of this patent

UNITED STATES PATENTS

| | | |
|---|---|---|
| 2,526,541 | Colley | Oct. 17, 1950 |
| 2,777,653 | Cotton et al. | Jan. 15, 1957 |

OTHER REFERENCES

Flight Magazine, Sept. 2, 1960, page 335.